UNITED STATES PATENT OFFICE.

RUDOLF KNIETSCH AND PAUL SEIDEL, OF LUDWIGSHAFEN, GERMANY.

PROCESS OF MAKING INDIGO-RED.

SPECIFICATION forming part of Letters Patent No. 625,268, dated May 16, 1899.

Application filed November 16, 1898. Serial No. 696,624. (No specimens.)

*To all whom it may concern:*

Be it known that we, RUDOLF KNIETSCH, a subject of the King of Prussia, German Emperor, and PAUL SEIDEL, a subject of the King of Saxony, doctors of philosophy, both residing at Ludwigshafen-on-the-Rhine, in the Kingdom of Bavaria and Empire of Germany, have invented new and useful Improvements in the Manufacture of Isatin Products and of Indigo-Red Coloring-Matters, of which the following is a specification.

It is well known that indigo can be prepared by heating phenyl glycocol, its homologues and analogues, including phenyl glycocol carboxylic acid, with caustic alkali and oxidizing the indoxylic leuco product obtained in a suitable way. See, for instance, the specifications of the German patents Nos. 54,626 and 56,273. In these specifications it is repeatedly recommended to conduct the melt as far as possible in the absence of air. If the air be permitted unlimited access, a charring or burning of the materials is liable to take place.

We have discovered that by a limited extent of oxidation a phenyl-glycocol body can be converted into an isatinic body and that the isatinic body so produced can be converted into coloring-matter by treatment with an indoxyl body.

The following examples will serve to illustrate the manner in which the invention can be carried into practical effect. The parts are by weight.

*Example 1. Production of isatin products by melting in the presence of air.*—Mix together about seven hundred (700) parts of completely dry neutral phenyl-glycocol-ortho-carboxylic acid sodium salt with one thousand four hundred (1,400) parts of caustic soda freed from water as fully as possible. The mixing should be effected in such a way that a fine loose powder is obtained containing air. Heat this mixture to about 260° to 370° centigrade in such a way that the oxygen of the air contained in it can take part in the reaction. Continue heating until the mass shows no further increase in the intensity of the yellow or orange color that it assumes. Then allow to cool. Dissolve the melt in water, pass a stream of air through to oxidize the leuco compound produced to indigo, and filter from the indigo thus obtained. The mother-liquor contains the sodium salt of isatinic acid. We have found that it is liable to decomposition if boiled with strong alkaline liquids. Concentrate the solution by evaporation at as low a temperature as possible, preferably *in vacuo*. The alkaline salt of the isatinic acid separates out, being with difficulty soluble in caustic alkaline liquid. The salt obtained in this way can either be used as such or can be converted in a known way into isatin itself.

In the above example instead of phenyl glycocol ortho carboxylic acid other phenyl glycocol bodies, such as phenyl glycocol itself or its homologues and analogues, can be employed and isatin compounds obtained.

*Example 2. Preparation of indigo-red in alkaline solution from the mother-liquors from a melt conducted in the presence of air.*—Take the mother-liquor obtained from seven hundred (700) parts of phenyl-glycocol-ortho-carboxylic acid after treatment with alkali and air in the melting operation, dissolving in water, oxidizing, filtering off the indigo, all as described in the foregoing example, and neutralize with sulfuric acid. Next dissolve twenty (20) parts of fresh indigo melt, obtained as described in Example 1, in the neutral solution. Neutralize again, and then make the liquid alkaline with carbonate of soda and boil. Indigo-red separates out, and the boiling is continued until no further separation takes place.

*Example 3. Preparation of indigo-red in acid solution from the mother-liquors of a melt conducted in the presence of air.*—Take the mother-liquors freed from indigo obtained by treating seven hundred (700) parts of ethyl-phenyl-glycocol in a melt, as described in Example 1. Neutralize with sulfuric acid and add about twenty (20) parts of the same indigo melt and about forty-five (45) parts of sulfuric acid containing about sixty-two per cent. $H_2SO_4$. Boil for about an hour and filter off the indigo-red.

In a manner analogous to that described in the above examples either simple and mixed indigo-reds can be obtained by condensing the various isatinic acids and isatins with the various indoxyls resulting, respectively, from the treatment of the various aromatic glycocol bodies in the manner hereinbefore described.

Now what we claim is—

1. The process which consists in melting a phenyl-glycocol body with caustic alkali in the presence of a sufficient quantity of oxygen to produce an isatinic body, substantially as described.

2. The process for the manufacture of coloring-matter, consisting in melting a phenyl-glycocol body with caustic alkali in the presence of a limited quantity of air, then acting upon the isatinic body so obtained with an indoxyl body, all substantially as described.

In testimony whereof we have hereunto set our hands in the presence of two subscribing witnesses.

RUDOLF KNIETSCH.
PAUL SEIDEL.

Witnesses:
ERNEST F. EHRHARDT,
HOWARD E. J. INGLEY.

It is hereby certified that in Letters Patent No. 625,268, granted May 16, 1899, upon the application of Rudolf Knietsch and Paul Seidel, of Ludwigshafen, Germany, for an improvement in "Processes of Making Indigo-Red," an error appears in the printed specification requiring correction, as follows: In line 45, page 1, the figures and degree mark "370°" should read *270°;* and that the said Letters Patent should be read with this correction therein that the same may conform to the record of the case in the Patent Office.

Signed, countersigned, and sealed this 15th day of August, A. D., 1899.

[SEAL.]                                                    WEBSTER DAVIS,
*Assistant Secretary of the Interior.*

Countersigned:
    A. P. GREELEY,
        *Acting Commissioner of Patents.*